(12) United States Patent
 Oostendorp

(10) Patent No.: US 8,958,627 B2
(45) Date of Patent: Feb. 17, 2015

(54) SYSTEM AND METHOD OF DISTRIBUTED PROCESSING FOR MACHINE-VISION ANALYSIS

(71) Applicant: Sight Machine, Inc., Ann Arbor, MI (US)

(72) Inventor: Nathan Oostendorp, Ann Arbor, MI (US)

(73) Assignee: Sight Machine, Inc., Ann Arbor, MI (US)

( * ) Notice: Subject to any disclaimer, the term of this patent is extended or adjusted under 35 U.S.C. 154(b) by 129 days.

(21) Appl. No.: 13/830,781

(22) Filed: Mar. 14, 2013

(65) Prior Publication Data

US 2013/0301902 A1    Nov. 14, 2013

Related U.S. Application Data

(60) Provisional application No. 61/644,932, filed on May 9, 2012.

(51) Int. Cl.
  *G06K 9/00*    (2006.01)
  *G06T 7/00*    (2006.01)
(52) U.S. Cl.
  CPC ............... *G06T 7/0004* (2013.01); *G06T 7/001* (2013.01); *G06T 2207/30164* (2013.01)
  USPC ........... 382/141; 382/100; 382/153; 348/113; 348/125; 348/143
(58) Field of Classification Search
  USPC .......... 382/100, 104, 141, 153; 348/113, 125, 348/143
  See application file for complete search history.

(56) References Cited

U.S. PATENT DOCUMENTS

| | | | |
|---|---|---|---|
| 5,835,627 A * | 11/1998 | Higgins et al. | 382/167 |
| 6,795,200 B1 * | 9/2004 | Barman et al. | 356/606 |
| 6,931,602 B1 | 8/2005 | Silver et al. | |
| 7,305,449 B2 * | 12/2007 | Simpson et al. | 709/207 |
| 7,441,030 B1 | 10/2008 | Smith et al. | |
| 7,961,201 B1 | 6/2011 | Fix et al. | |
| 7,970,924 B2 | 6/2011 | Sarao et al. | |
| 7,986,953 B2 * | 7/2011 | Rice et al. | 455/456.1 |
| 8,090,592 B1 * | 1/2012 | Goodall et al. | 705/2 |

(Continued)

OTHER PUBLICATIONS

International Search Report and Written Opinion received for PCT Patent Application No. PCT/US2013/028752, mailed on May 9, 2013, 19 pages.

(Continued)

*Primary Examiner* — Aaron W Carter
(74) *Attorney, Agent, or Firm* — Morrison & Foerster LLP

(57) ABSTRACT

A computer-implemented method for designating a portion of a machine-vision analysis to be performed on a worker. A set of machine-vision algorithms is obtained for analyzing a digital image of a product. An overall time estimate is determined that represents the processing time to analyze the digital image using the entire set of machine-vision algorithms. If the overall time estimate is greater than a threshold value, then an algorithm time estimate for each of two or more algorithms of the set of machine-vision algorithms is obtained. A rank associated with each of the two or more algorithms is computed based on the algorithm time estimates. A designated algorithm to be performed on the worker is selected based on the rank associated with each of the two or more algorithms. The digital image may then be analyzed on the worker using the designated algorithm.

24 Claims, 12 Drawing Sheets

(56) References Cited

U.S. PATENT DOCUMENTS

| | | | |
|---|---|---|---|
| 2001/0043358 A1* | 11/2001 | Schwartz | 358/1.15 |
| 2001/0048760 A1 | 12/2001 | Bett et al. | |
| 2003/0011819 A1* | 1/2003 | Toda | 358/1.15 |
| 2004/0093100 A1 | 5/2004 | Gleis | |
| 2005/0157949 A1* | 7/2005 | Aiso et al. | 382/299 |
| 2006/0091219 A1* | 5/2006 | Joseph et al. | 235/462.25 |
| 2007/0035781 A1* | 2/2007 | Maruyama | 358/405 |
| 2008/0016119 A1 | 1/2008 | Sharma et al. | |
| 2009/0268950 A1 | 10/2009 | Kuo | |
| 2010/0277774 A1* | 11/2010 | Reid et al. | 358/474 |
| 2010/0304755 A1* | 12/2010 | Rice et al. | 455/456.1 |
| 2012/0033716 A1* | 2/2012 | Hoang et al. | 375/150 |
| 2012/0249577 A1* | 10/2012 | Sukenori | 345/619 |
| 2013/0002609 A1* | 1/2013 | Lim et al. | 345/175 |
| 2013/0054566 A1* | 2/2013 | Xu et al. | 707/713 |
| 2013/0129372 A1* | 5/2013 | Manabe | 399/82 |
| 2013/0132148 A1* | 5/2013 | Trummer et al. | 705/7.27 |
| 2014/0180458 A1* | 6/2014 | Nayak et al. | 700/94 |

OTHER PUBLICATIONS

Chiu et al., "Computer Vision on Tap", Massachusetts Institute of Technology. Media Laboratory, Cambridge, MA, 2009, 8 pages.

International Search Report & Written Opinion received for PCT Patent Application No. PCT/US2013/040215, mailed on Nov. 26, 2013, 13 pages.

* cited by examiner

1000

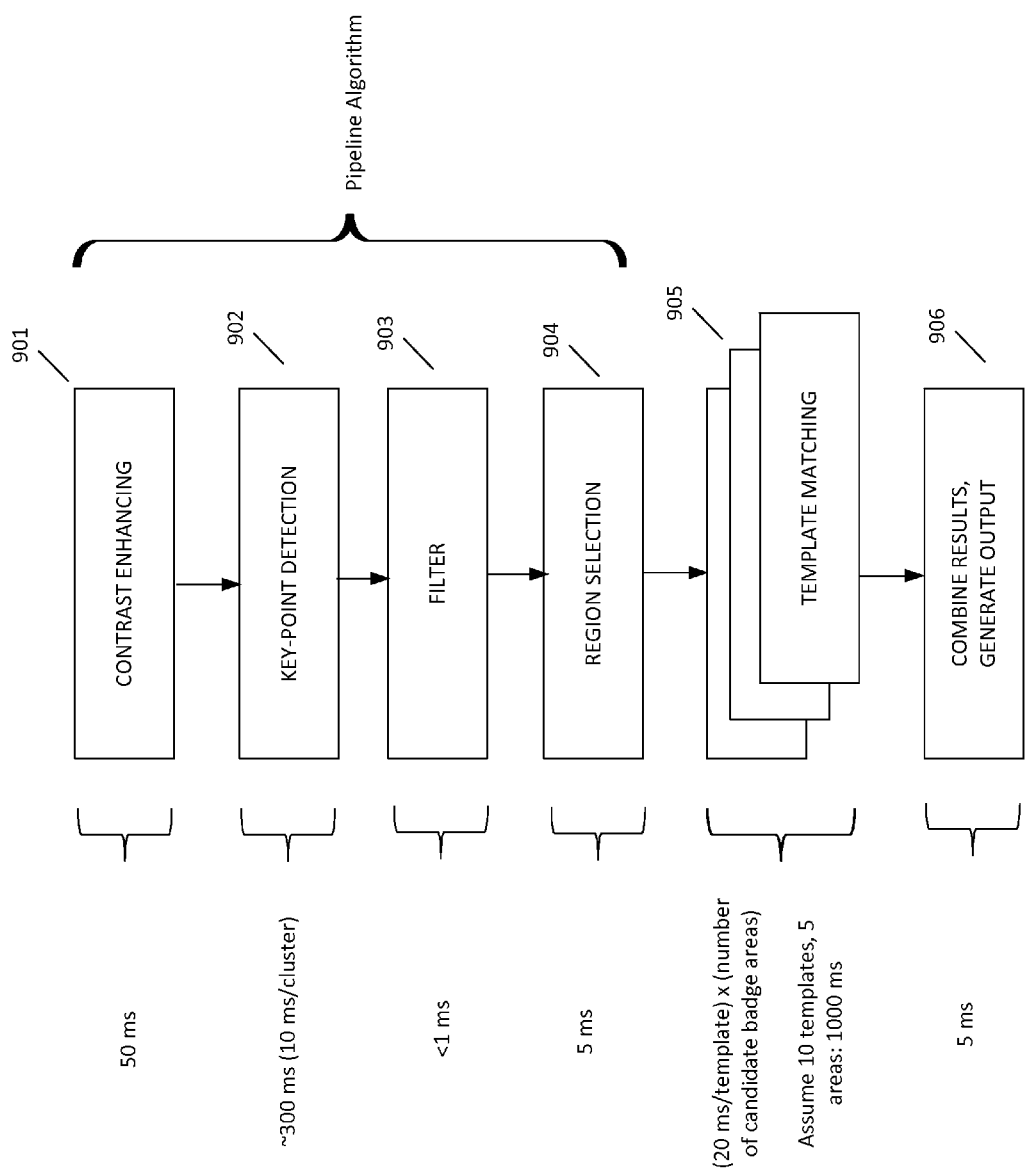

SYSTEM AND METHOD OF DISTRIBUTED PROCESSING FOR MACHINE-VISION ANALYSIS

CROSS-REFERENCE TO RELATED APPLICATION

This application claims the benefit under 35 U.S.C. 119(e) of prior U.S. Provisional Patent Application No. 61/644,932, filed May 9, 2012, which is hereby incorporated by reference in the present disclosure in its entirety.

BACKGROUND

1. Field

This application relates generally to the field of machine vision, and more specifically to a system and method for distributing a machine-vision analysis across multiple processors.

2. Description of Related Art

Machine vision is frequently used for product inspection in an industrial setting. In a typical machine-vision implementation, a digital image or video of a product is captured using a digital camera or optical sensor. By analyzing the digital image or video, key features of the product can be measured and the product can be inspected for defects.

In some industrial applications, machine vision is used to inspect parts on a production line. In order to keep up with production, the machine-vision processing rate should be at least as fast as the manufacturing production rate. However, in some cases, the machine-vision processing is computationally expensive and takes a significant amount of time to perform. As a result the machine-vision analysis cannot keep up with the rate of production. In this case, the production capacity may be limited by the machine-vision analysis, which is generally undesirable.

One solution to this problem is to increase the processing speed of the computer processor performing the machine-vision analysis. However, this approach may not be practical because faster processors are typically much more expensive. Additionally, there may be a diminishing return on the amount of processing speed that can be gained by purchasing faster, more expensive processors. This approach is also not necessarily scalable to address dynamically changing machine-vision processing loads or production rates.

Another solution is to limit the amount of machine-vision analysis that is performed by the processor to reduce the analysis time. However, this approach may not be practical or even possible in scenarios that require a detailed analysis of a high-resolution image to perform an inspection of the product.

The methods and systems described herein can be used to increase the processing capacity of a machine-vision system without the drawbacks of the approaches discussed above.

BRIEF SUMMARY

One exemplary embodiment includes a computer-implemented method for designating a portion of a machine-vision analysis to be performed on a worker. A set of machine-vision algorithms is obtained for analyzing a digital image of a product. An overall time estimate is determined that represents the processing time to analyze the digital image using the entire set of machine-vision algorithms. If the overall time estimate is greater than a threshold value, then an algorithm time estimate for each of two or more algorithms of the set of machine-vision algorithms is obtained. The algorithm time estimate represents the processing time to analyze the digital image using the respective machine-vision algorithm. A rank associated with each of the two or more algorithms is computed based on the algorithm time estimates. A designated algorithm to be performed on the worker is selected. The selection is based on the rank associated with each of the two or more algorithms. The designated algorithm comprises one of the two or more algorithms. In some cases, the digital image is analyzed on the worker using the designated algorithm.

In some embodiments, a second designated algorithm is selected based on the rank associated with each of the two or more algorithms and a difference between the overall time estimate and the threshold value. The second designated algorithm comprises one of the two or more algorithms.

In some embodiments, a second overall time estimate is determined. The second overall time estimate represents the processing time to analyze the digital image with the designated algorithm being performed on the worker. If the second overall time estimate is greater than a threshold value, then a second designated algorithm is selected based on the rank of the two or more algorithms. The second designated algorithm comprises one of the two or more algorithms. In some cases, the digital image is analyzed on a second worker using the second designated algorithm.

In one exemplary embodiment, the digital image is transmitted to the controller, the digital image having been captured using an image acquisition device. The digital image is analyzed at the controller using a first machine-vision algorithm of the set of machine-vision algorithms to compute a first result. A processing request is transmitted to the worker to perform the designated algorithm. The digital image is analyzed at the worker using the designated algorithm to compute a second result and transmitted to the controller. A measurement is computed based on the first result and the second result and stored. In some cases, the analysis using the first machine-vision algorithm at the controller and the analysis of the second machine-vision algorithm at the worker occur at least partially in parallel.

In some cases a quality metric is computed based on the measurement, wherein the quality metric relates to the quality of the product. The quality metric is displayed on a user interface.

In one exemplary embodiment, the digital image is transmitted to an archive server on a first data network. The digital image is stored on the archive server and transmitted to the worker on the first data network. The digital image is analyzed on the worker using the designated algorithm to obtain one or more of: an analyzed digital image, and a measurement. The analyzed digital image or the measurement is transmitted to the controller.

In some embodiments, one or more machine-vision algorithm of the set of machine-vision algorithms is a pipeline algorithm, wherein the pipeline algorithm includes at least a first machine-vision algorithm and a second machine-vision algorithm, wherein the output of the second machine-vision algorithm depends on the output of the first machine-vision algorithm. In some embodiments, the one or more machine-vision algorithms is a group of machine-vision algorithms.

DESCRIPTION OF THE FIGURES

FIG. 9A depicts a set of machine-vision algorithms.

DETAILED DESCRIPTION

Figure 1:
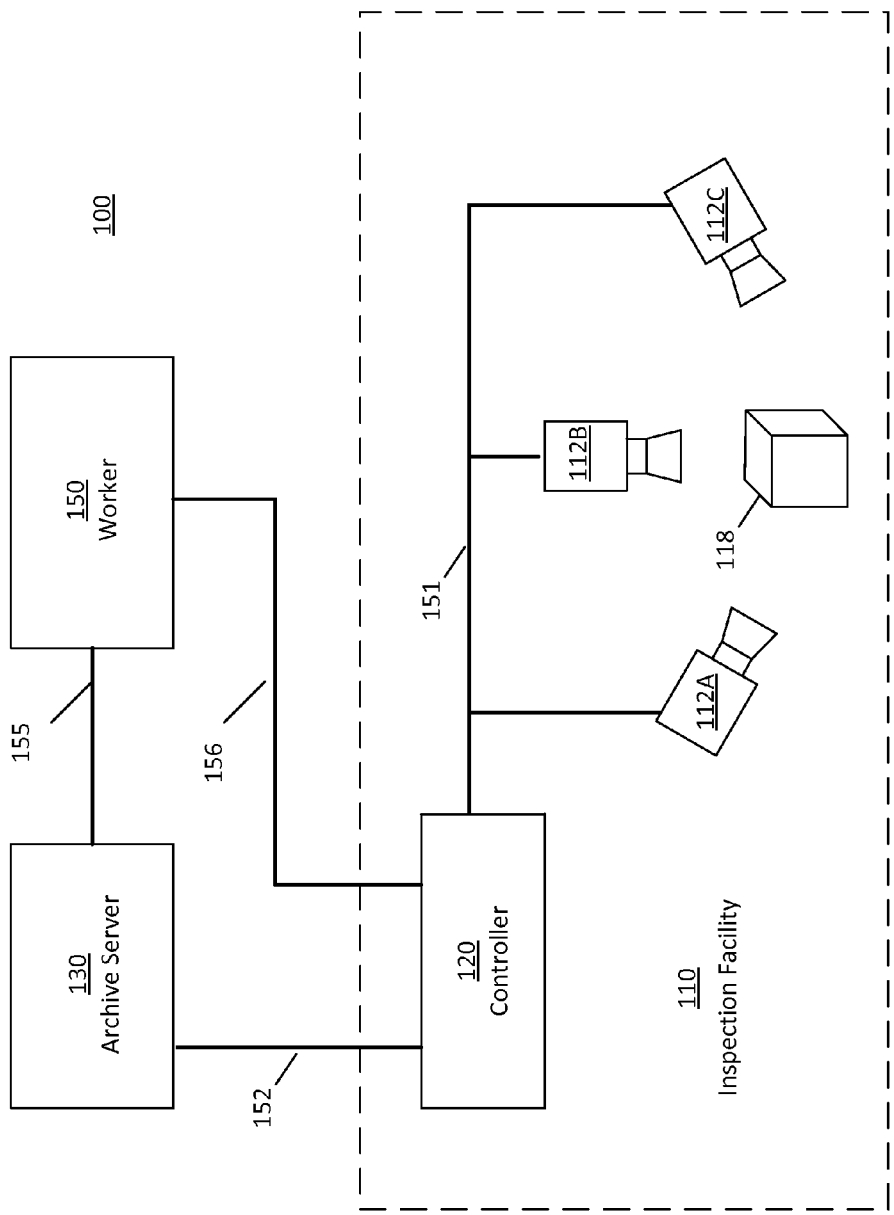
FIG. 1 depicts an exemplary machine-vision system.

Many manufacturing facilities employ formal quality inspection procedures designed to reduce product defects and costly product failures. Generally speaking, quality inspection includes the measurement and monitoring of key features of parts that may constitute some portion of a manufactured product. In small manufacturing facilities, quality inspection may be performed by a specially trained employee, such as a quality engineer or specialist, who inspects the parts at various stages of production. In larger facilities, human inspection is either impractical or impossible due to the number of inspections that are required.

As previously mentioned, machine vision is useful for inspecting parts or components of a manufactured product as they are being manufactured. Machine vision may be implemented using a digital camera at an inspection station in a manufacturing line. Typically, the inspection station is physically and electronically integrated with an automated production system. The automated production system is typically controlled locally by a programmable logic controller (PLC), computer system, or other electronic control device.

The machine-vision system described herein inspects the quality of parts on a production line by executing multiple machine-vision algorithms on one or more digital images that have been captured of a part. Each machine-vision algorithm typically includes multiple iterations of a set of complex operations that are performed on a high-resolution digital image. Additionally, there may be multiple machine-vision inspections that are performed using the same digital image.

The digital cameras used in an exemplary machine-vision system are configured to produce high-resolution images that are particularly suitable for detailed analysis. In some cases, a high-resolution image is a digital image having more than a million image pixels (megapixel image). Each high-resolution digital image constitutes a large data set (in the form of a two-dimensional pixel array, for example). The combination of large data sets and complex computations results in a processing load that is computationally intensive and relatively time-consuming. Thus, the time required to perform machine-vision analysis contributes significantly to the overall latency of an inspection system. In fact, the time required for machine-vision analysis is typically multiple orders of magnitude higher than, for example, the time required for the digital camera to acquire and transmit a digital image.

Traditional machine-vision implementations perform image processing operations using a single processing unit or CPU. In this case, the overall latency of the machine-vision analysis is constrained by the capabilities of the local processor. A single processor implementation typically cannot be scaled to accommodate a large number of computationally expensive image-processing operations. Additionally, as previously mentioned, a traditional machine-vision implementation may not be sufficiently fast to meet the timing requirements of the production line.

The system and techniques described herein overcome some of the inherent processing limitations of traditional machine vision implementations and reduce the latencies of machine-vision analysis.

1. Machine-Vision System with Distributed Processing

FIG. 1 depicts an exemplary machine-vision system. The machine-vision system 100 of FIG. 1 utilizes multiple computing devices connected by one or more data networks to perform distributed processing for machine-vision analysis of a digital image. As described in more detail below, the machine-vision system 100 can be used to distribute the processing of multiple machine-vision algorithms in order to meet specified timing criteria.

As shown in FIG. 1, multiple inspection stations 112A-C are configured to view an exemplary product 118 at an inspection facility 110. Each inspection station 112A-C is configured to capture a digital image of at least a portion of the product 118 using an image acquisition device, such as a camera or imaging sensor. In this example, multiple inspection stations are depicted. However, in other implementations, only one inspection station may be used.

Images captured by the inspection stations 112A-C are transmitted to the controller 120 over a data network 151, and also transmitted to the archive server 130 over a data network 152 for storage. The controller 120 is configured to perform one or more machine-vision algorithms on the captured images and to compute one or more measurements based on the image of the product 118. The controller 120 is also configured to perform an assessment of the processing capabilities that are required to execute the one or more machine-vision algorithms within specified timing criteria. As described in more detail below with respect to process 1100, the controller 120 is also configured to utilize a worker 150 to perform some or all of the machine-vision algorithms.

As shown in FIG. 1, the machine-vision system 100 also includes a worker 150 connected to the controller 120 and an archive server 130 by data networks 156 and 155, respectively. The worker 150 is configured to operate as an additional processing unit to perform machine-vision algorithms designated by the controller 120. The archive server 130 is configured to temporarily store digital images for use by the worker 150. The archive server 130 may also be configured to store digital images in a database for archival or subsequent processing.

Figure 2:
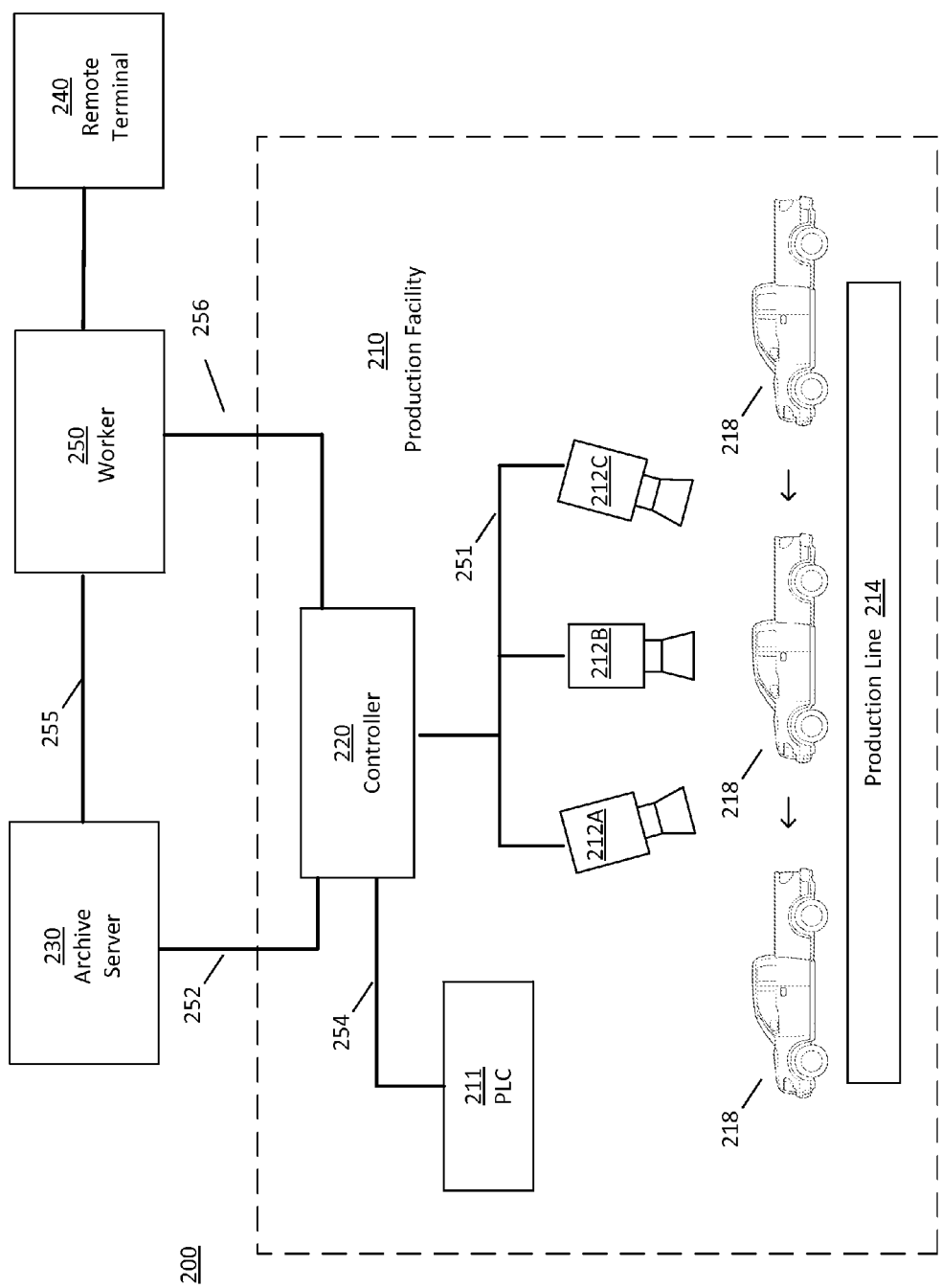
FIG. 2 depicts an exemplary machine-vision system for inspecting vehicles.

FIG. 2 depicts an exemplary implementation of a machine-vision system for inspecting a vehicle product. The machine-vision system 200 depicted in FIG. 2 includes multiple digital-camera inspection stations 212A-C for monitoring the quality of a vehicle 218 being manufactured at a production facility 210. In this example, the vehicle 218 is near the final stages of production. As shown in FIG. 2, the vehicles 218 progress across the production line 214 from right to left.

Each of the inspection stations 212A-C includes a digital camera and image acquisition software adapted to capture a digital image of a portion of the vehicle 218. In this example, the digital camera includes a CCD (charge coupled device) digital sensor and optical components (lenses, lighting, etc.) for producing an optical image of the portion of the vehicle 218 on the digital sensor surface. When triggered by an external signal, a single image or video image sequence is captured by the digital camera and temporarily stored in local computer memory.

While a digital camera is particularly suitable in this scenario, other types of image acquisition devices, including infrared sensors, flat-bed scanners, optical arrays, laser scanners, and the like could be used to capture a digital image. In this example, a digital image includes a multi-dimensional array of values that correspond to the optical input of the digital camera sensor. Depending on the type of image acquisition device, a digital image may also include a bitmap array of data values. It is not necessary that the digital image referred to herein includes data that can be readily visualized as a picture image.

The machine-vision system 200 can be used to verify that the product satisfies a quality criterion by analyzing information captured at one or more inspection stations 212A-C. Specifically, the machine-vision system 200 is configured to use digital camera equipment to inspect multiple badges that are attached to the vehicle 218.

In this example, the production facility 210 is used to produce a variety of vehicles that are equipped with different optional equipment. A particular combination of optional equipment, also referred to as a trim level, receives a different set of vehicle badges. In some cases, vehicles having different trim levels are manufactured consecutively in the production line 214. In some cases, due to operator error, a vehicle badge that is installed does not correspond to the trim level. If the vehicle is shipped to the dealer with the wrong badge, it may cost the manufacturer several hundred dollars to return the vehicle to the production facility to correct the defect. The system can be configured to verify that the correct vehicle badge is installed. This verification is based on a comparison of the badge images acquired by the inspection stations 212A-C to multiple templates to determine if there is a likely match.

Figure 5:
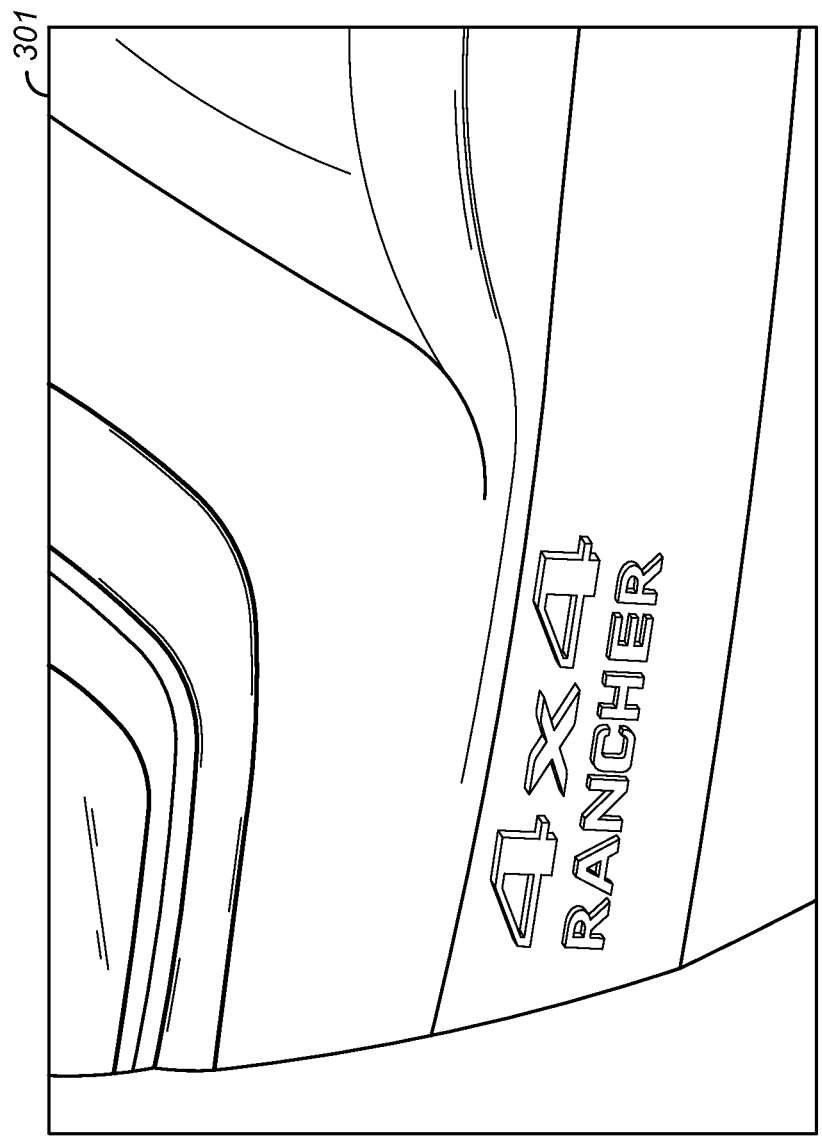
FIG. 5 depicts a digital image captured at an inspection station.
Figure 6:
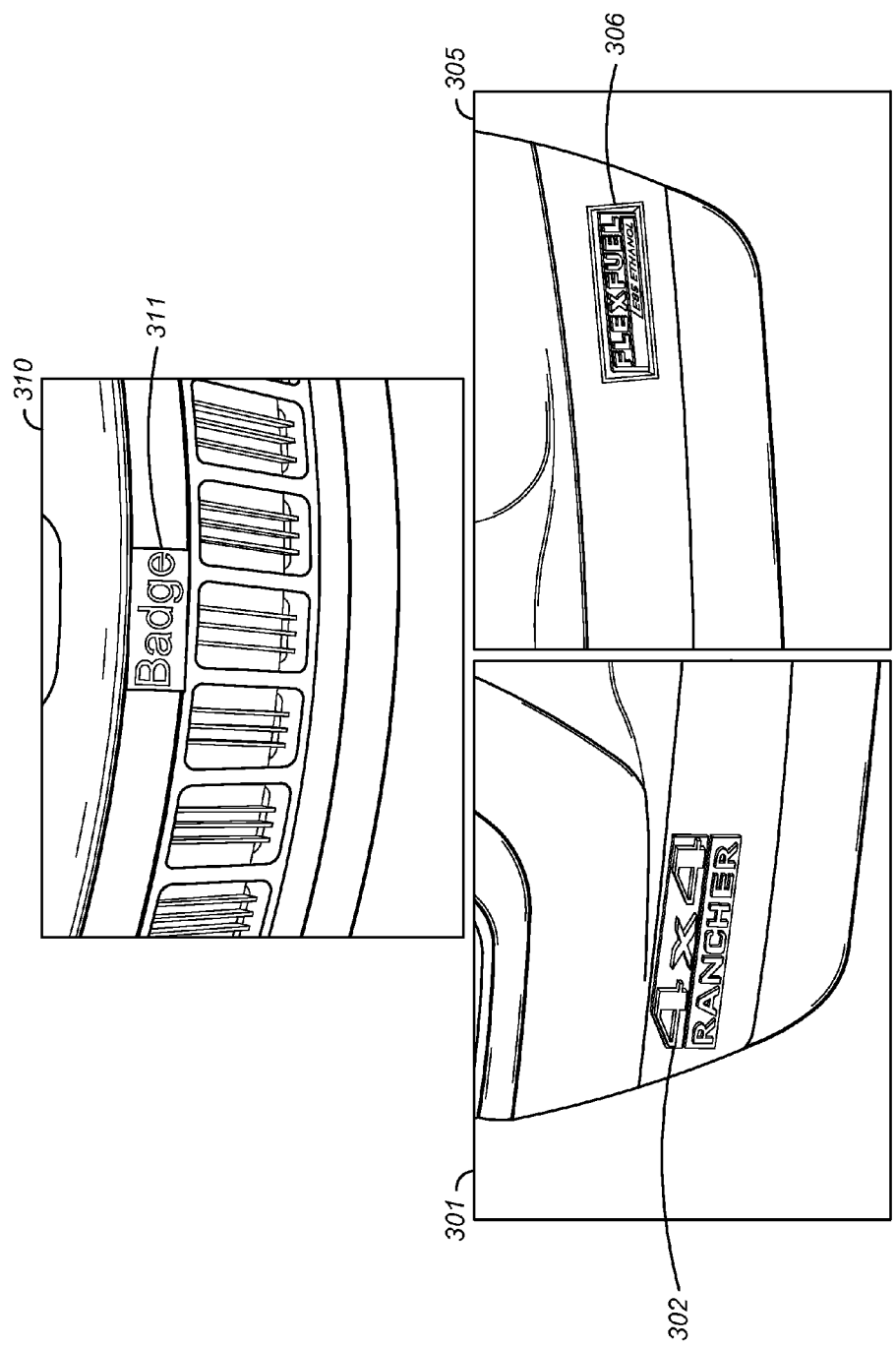
FIG. 6 depicts results of an analysis of digital images captured at multiple inspection stations.

With reference to FIG. 2, multiple inspection stations 212A-C are configured to capture images of a different portion of the vehicle 218 that is being manufactured. Exemplary digital images are depicted in FIGS. 5 and 6. Each inspection station 212A, 212B, and 212C includes a digital camera and image acquisition software adapted to capture and transmit image data to controller 220 over a data network 251. The first data network 251 is typically an industrial protocol network, such as OPC, Modbus, ProfiNet, and the like. The first data network may also be a dedicated conduit communication, such as a universal serial bus (USB), IEEE 802 (Ethernet), IEEE 1394 (FireWire), or other high-speed data communication standard.

With reference to FIG. 2, the controller 220 serves multiple functions in the machine-vision system 200. Generally, the controller 220 (1) interfaces with the automation system to operate multiple inspection stations; (2) collects digital images from the inspection stations 212A-C; (3) determines whether to offload portions of the machine-vision analysis to the worker 250, and if so, which portions to offload; (4) executes a sequence of machine-vision analysis algorithms on the collected digital images to obtain quality measurements, optionally sending requests to the worker 250 to execute portions of the analysis; and (5) transmits the digital image and computed quality measurements to archive server 230. Although the machine-vision system 200 depicts a single controller 220 located at the production facility 210, more than one controller could be used in the same production facility 210 or multiple controllers could be used at different production facilities.

The controller 220 depicted in FIG. 2 is typically a dedicated computer system having a computer processor and non-transitory computer readable memory for storing computer instructions for performing the functions described below. In many cases, the controller 220 is an industrial-grade computer system configured to operate for extended periods of time without shutting down or being rebooted. In some cases, the controller 220 includes one or more specialized digital signal processors (DSPs) for analyzing large quantities of digital image data.

With respect to FIG. 2, in a typical implementation, the vehicles 218 are produced at a regular cycle rate, also referred to as the production cycle. To avoid causing delays in the production of the vehicles 218, the inspection stations 212A-C must operate within the timing requirements of the production cycle.

The timing of the production cycle may be managed using an automation controller, such as a (PLC), computer system, or other electronic control device. As shown in FIG. 2, the machine-vision system 200 includes a PLC 211 for coordinating the operations performed at various stages in the production line 214. In general, the PLC 211 dictates the timing and rate of production of the production line 214, and may monitor the latency of the machine-vision system 200 to coordinate the inspection with other processes in the production line 214. The PLC 211 is typically part of an existing automation system and interfaces with the various devices in the production facility 210 using a data network 254 or dedicated communication conduit.

The controller 220 is connected to the PLC 211 of the automation system and can receive information about the location of the vehicles 218 and the state of the production line 214 directly from the PLC 211. Thus, the controller 220 is able to control the operation of each inspection station 212A, 212B, or 212C in accordance with the timing of the overall production line 214. In this example, the controller 220 collects information related to the production cycle or receives timing information from the PLC 211. For example, the controller may compute a cycle time based the timing of previous events controlled by the PLC. The controller may also compute a cycle time based on internally triggered events or operations. Based on the cycle time, the controller 220 may determine the maximum amount of time allotted for the machine-vision analysis process. As discussed in more detail below with respect to process 1000, the controller may also compute a threshold value (e.g., threshold time value) for purposes of determining if one or more of the machine-vision algorithms should be off-loaded to a worker 250.

As shown in FIG. 2, the machine-vision system 200 includes a remote archive server 230 connected to the controller 220 by a data network 252. The archive server 230 may store images for processing by the worker 250 and may also maintain an archive storage of previously processed images and quality measurements. The digital images collected at the controller 220 are communicated over the data network 252 to the archive server 230. The data network 252 used for the communication typically includes either a Local Area Network (LAN) or a Wide Area Network (WAN) using a TCP/IP or other Internet communication protocol.

The machine-vision system 200 also includes a worker 250 that is connected to the controller 220 by a data network 256 and to the vision server 230 by data network 255. The controller 220 is configured to transmit processing requests to the worker 250 over data network 255, and the worker 250 is configured to execute a subset of the required machine-vision algorithms, in some cases executing in parallel with the controller 220. The data network 256 used for the communication typically includes either a Local Area Network (LAN) or a Wide Area Network (WAN) using a TCP/IP or other Internet communication protocol. In some embodiments, data networks 252 and 256 are the same network. The worker 250 depicted in FIG. 2 is typically a dedicated computer system having a computer processor and non-transitory computer readable memory for storing computer instructions for performing the functions described below.

As shown in FIG. 2, the machine-vision system 200 may be split into portions that are located at the production facility 210 and portions that are located outside of the production facility 210. However, in some implementations, the worker 250, the archive server 230, or the entire machine-vision system 200 may be located inside the production facility 210. In other implementations, the controller 220 or the entire machine-vision system 200 may be located outside the production facility 210. In still other implementations, the worker 250 may be located within the vision server 230 or within the controller 220, or there may be multiple workers 250 in one or more locations.

Figure 3:
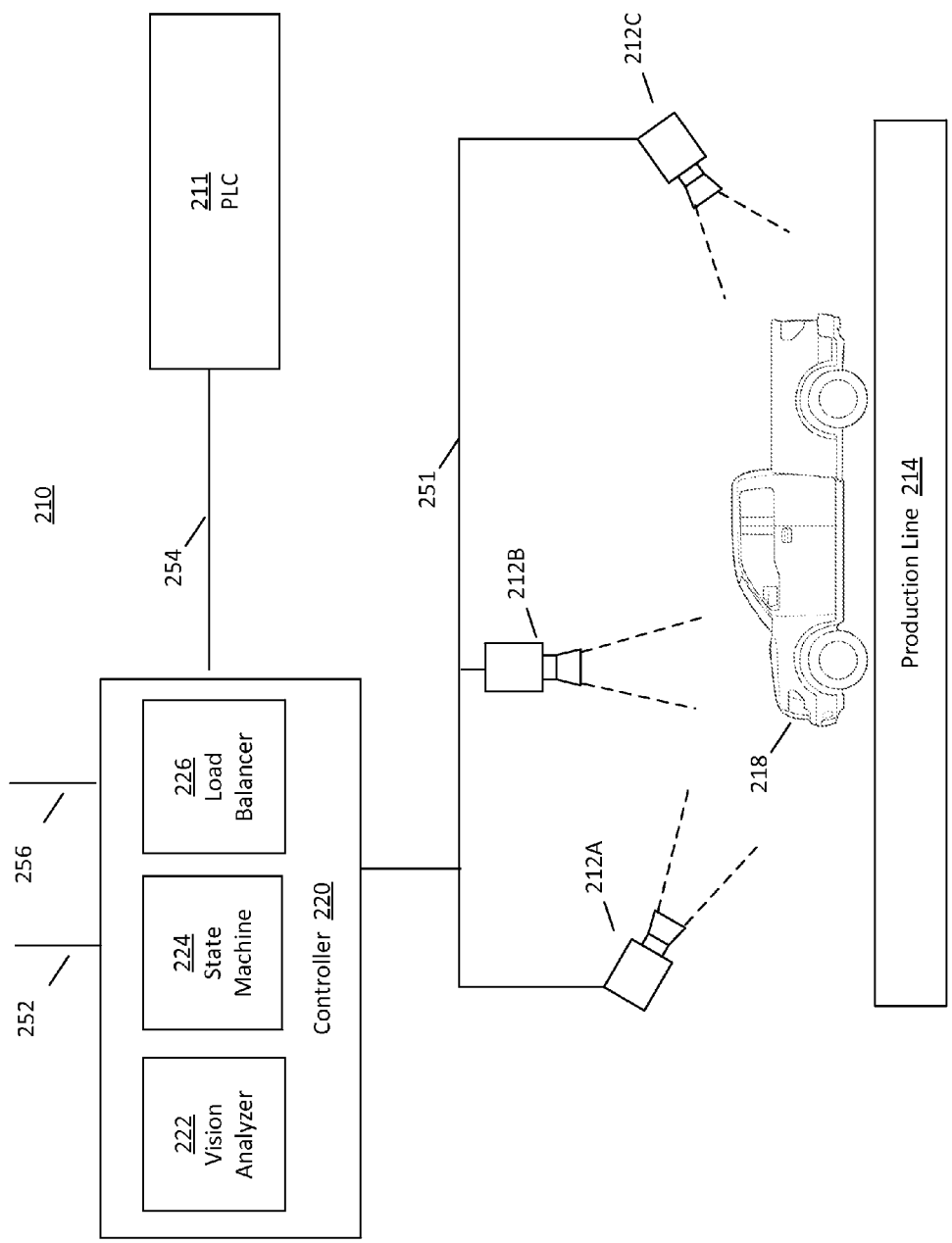
FIG. 3 depicts the portion of the exemplary system that is located at the production facility.

FIG. 3 depicts the portion of machine-vision system 200 located at the production facility 210. As shown in FIG. 3, the depicted portion of the production line 214 includes multiple inspection stations 212A-C. As discussed above, each inspection station 212A-C is configured to capture a digital image of a different portion of the vehicle 218 being manufactured and can be used to detect the type of multiple vehicle badges in an automated production line 214.

As shown in FIG. 3, the controller 220 includes several functional units. As described earlier, the controller 220 is configured to control the inspection stations 212A-C. In this example, the portion of the controller 220 that controls the inspection stations 212A-C is configured to operate as a logical state machine. In one example, the state machine 224 of the controller 220 is configured to be in one of multiple logical states. A first logical state may be, for example, "waiting for vehicle." In response to a signal or message from the PLC 211 indicating that a vehicle 218 has arrived, the state machine 224 on the controller 220 may transition to a "capture image" state. In this logical state, the state machine 224 causes the controller 220 to send a signal or message to one or more of the inspection stations 212A, 212B, or 212C instructing it to capture a digital image. The state machine 224 then enters a "waiting for image" state until the digital image is transmitted from one of the inspection stations 212A, 212B, or 212C to the controller 220 over the data network 251. In some cases, the state machine 224 may also implement a timer operation that can be used to measure how long various operations take to execute. The state machine 224 may also be used by the controller 220 to determine the threshold value (e.g., threshold time value) for offloading processes to the worker 150.

Another function of the controller 220 is to perform analysis on the collected digital images to obtain measurements and information related to the quality of the product. In this example, the controller 220 includes a vision analyzer 222 for analyzing digital images of the vehicle badges captured by the inspection stations 212A-C. As described in more detail below with respect to process 1100, the vision analyzer 222 is configured to analyze a digital image using one or more machine-vision algorithms to obtain a measurement.

A third function of the controller 220 is to perform a load-balancing analysis to ensure that the machine-vision analysis can be performed within specified timing criteria. With respect to FIG. 3, a load-balancing analysis is performed by the load balancer 226. In this example, the load balancer 226 uses a threshold value to determine if, and how many processes should be offloaded to the worker 150. One example of the load balancer operation is provided below with respect to process 1000 of FIG. 8.

Figure 4:
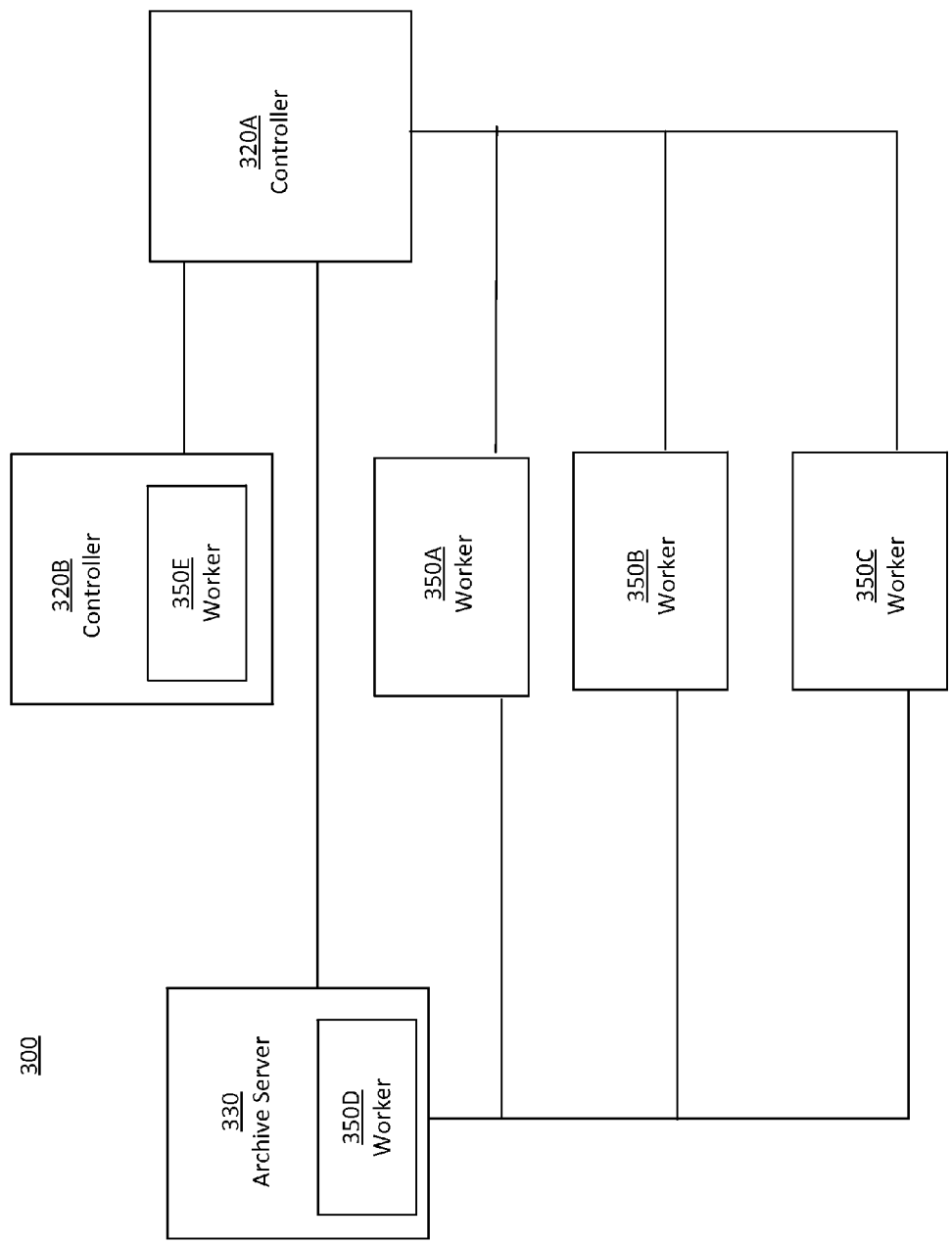
FIG. 4 depicts an exemplary machine-vision system with multiple workers.

FIGS. 1 and 2 depict exemplary systems having a single worker (150, 250). However, in some implementations, it may be advantageous to include multiple workers in order to increase the processing power of the system. By adding multiple workers, the computing capacity of the machine-vision system can be adapted to provide for dynamic processing loads or production rates. FIG. 4 depicts a portion of a machine-vision system 300 having multiple workers 350A-E deployed in various locations. In this example, a worker may be created on one of many computing devices having machine-vision processing capabilities and communication with the controller 320A. As shown in FIG. 4, machine-vision system 300 includes three stand-alone workers 320A-C that are connected to the controller 320A via a data network. System 300 also includes a worker 350D that is integrated with the archive server 330 and connected to the controller 320A via a data network. As shown in FIG. 4, a worker 350E may also be integrated into a second controller 320B, which is connected to (first) controller 320A via the data network.

The machine-vision systems 100 (as shown in FIG. 1), 200 (as shown in FIGS. 2-3), and 300 (as shown in FIG. 4) may provide advantages over some prior art systems. For example, the machine-vision systems 100, 200, and 300 can be configured to distribute the processing required for machine-vision analysis across multiple processing units. As a result, the processing capacity and speed of the machine-vision system may be increased with respect to other single-processor implementations. This increased speed, in turn, reduces the latency required to determine whether a part meets a specified quality criteria.

2. Exemplary Processes for Using a Worker for Machine Vision Analysis

Figure 8:
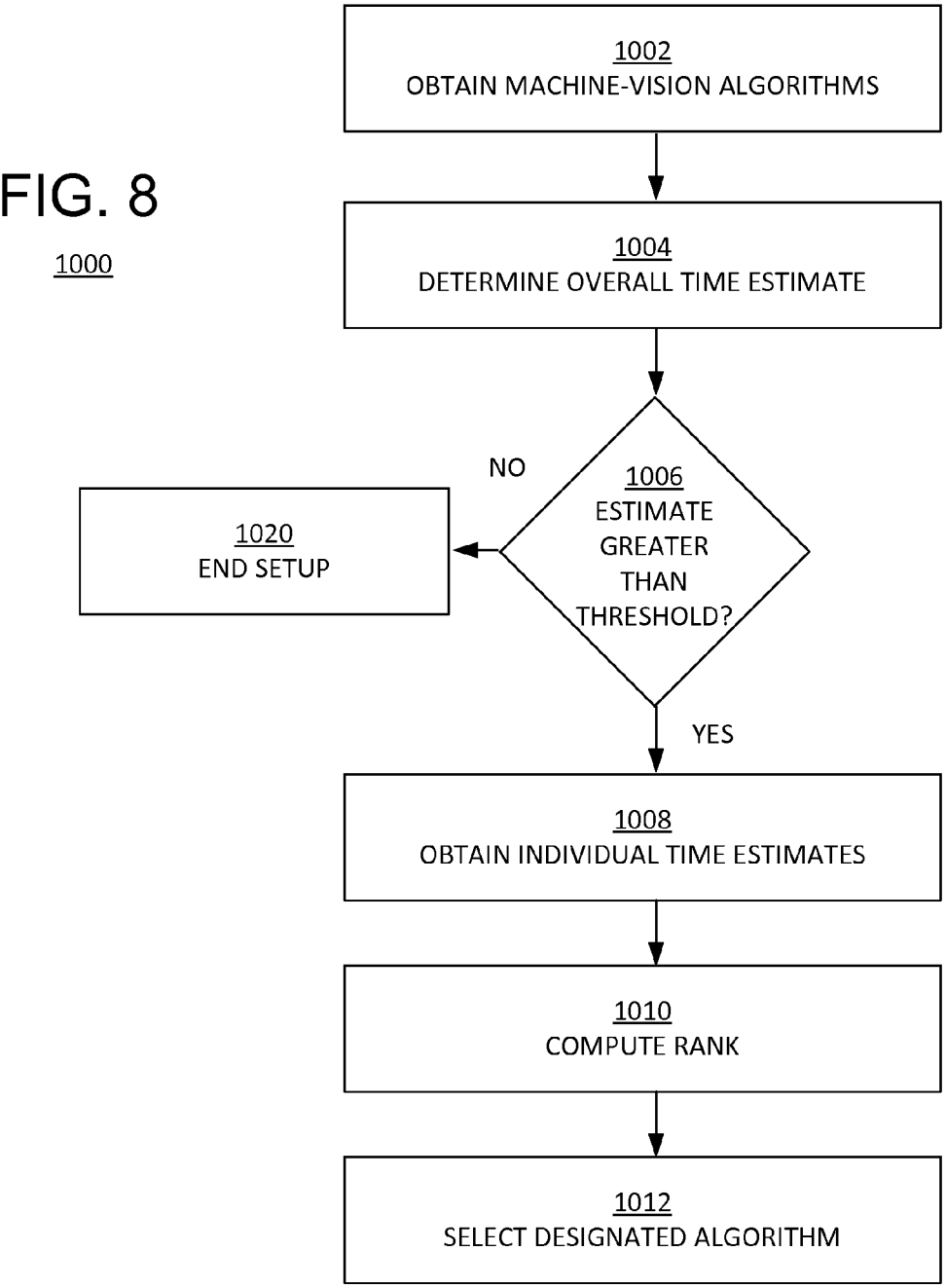
FIG. 8 depicts an exemplary process for selecting machine-vision analysis algorithms to be performed by a worker.
Figure 10:
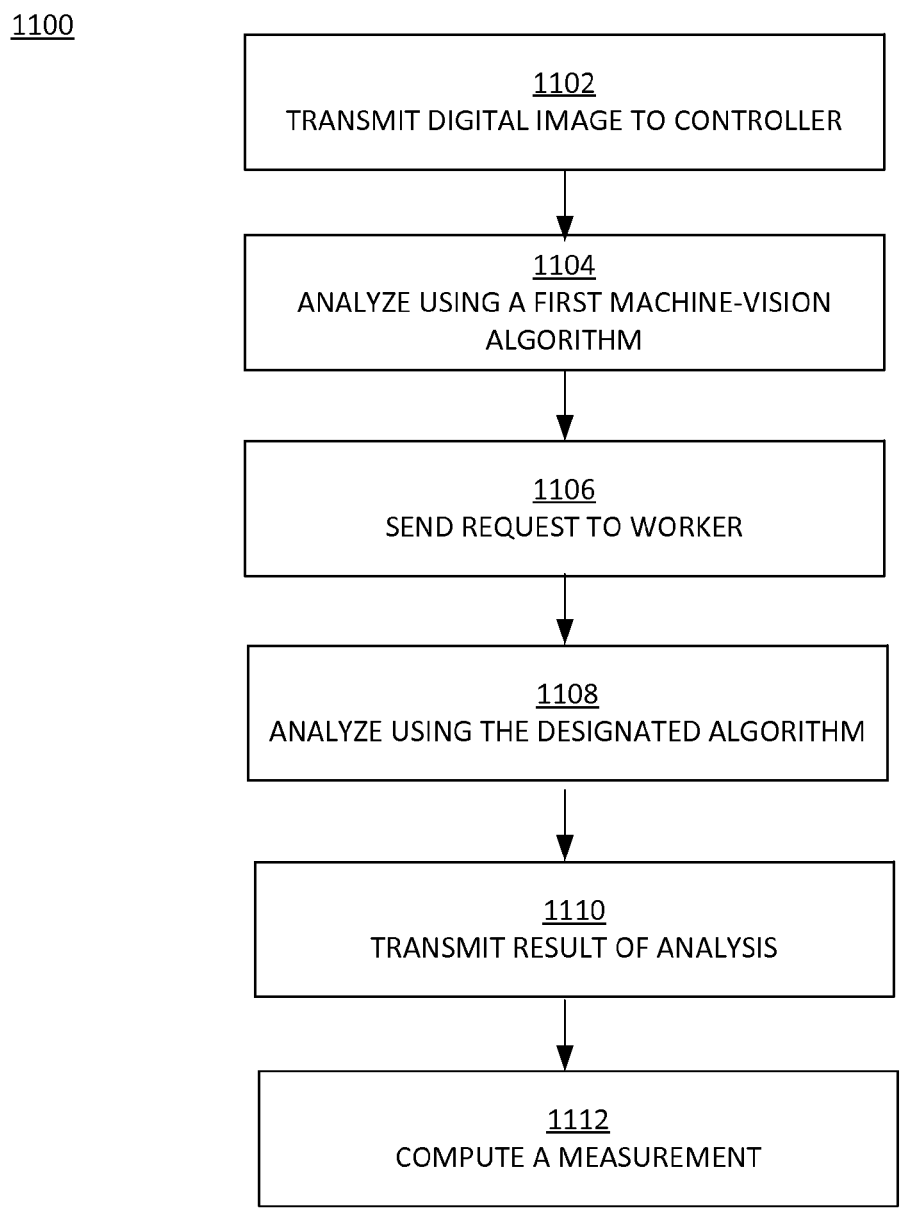
FIG. 10 depicts an exemplary process for analyzing an image using a machine-vision system with a worker.

FIGS. 8 and 10 depict exemplary processes 1000 and 1100 for using a worker in a machine-vision system. With reference to FIG. 2, the exemplary processes can be used to implement load balancing between a controller 120 and a worker 250 in a machine-vision system 200. For the purposes of the following discussion, the machine-vision system 200 is configured to analyze images of vehicle badges, such as those depicted in FIGS. 5-6. However, the following processes could be more generally applied to monitor quality metrics associated with a variety of manufactured products or processes.

FIG. 8 depicts an exemplary process 1000 for performing a setup procedure for a machine-vision system with load-balancing capabilities. With reference to FIG. 2, in the load-balancing machine-vision system 200, the controller 220 may perform process 1000 in preparation for performing machine-vision analysis of parts on a production line. Process 1000 may be performed, for example, when the system is initialized, at a specified time interval, or in response to a change in the timing of the machine-vision analysis. In this example, process 1000 is executed by the controller 220 to identify portions of the machine-vision analysis to be offloaded from the controller 220 to a worker 250.

In operation 1002, a set of machine-vision algorithms is obtained. The set of machine-vision algorithms determines the image processing that will be performed by the controller on a captured digital image. The set of machine-vision algorithms may be obtained from a variety of sources. For example, the set of machine-vision algorithms may be input by a user at a computer terminal or may be received from a library of machine vision software. The machine-vision algorithms may be specified using the Vision Query Language (VQL), or another technique suitable for specifying machine-vision analysis.

With respect to the machine-vision system 200 depicted in FIG. 2, the set of machine-vision algorithms are used to analyze images of the vehicle 218 to determine if an image of a vehicle badge matches a set of templates. FIG. 5 depicts an exemplary digital image 301 captured by a digital camera (image acquisition device) at an inspection station. In particular, FIG. 5 depicts a digital image 301 of the rear gate portion of a vehicle having the left rear gate vehicle badge.

In this example, the set of machine-vision algorithms are used to analyze a digital image of the vehicle to assess the quality of the vehicle including the type of badge that is installed. In other implementations, a different set of machine-vision algorithms could be used to assess the quality of the badge, the quality of the badge installation, or another visual aspect of the vehicle.

FIG. 9A depicts an exemplary set of machine-vision algorithms for analyzing a digital image of a vehicle badge to determine the type of badge that is installed. Initially, one or more contrast-enhancing machine-vision algorithms 901 may be applied to the digital image. The contrast-enhancing algorithms 901 brighten the digital image and increase the contrast between light and dark pixels. After the contrast has been enhanced, a key-point detection algorithm 902 is used to identify one or more candidate areas of the digital image that may contain a representation of the vehicle badge. The identified candidate areas are then processed with a filter algorithm 903, which eliminates regions having a point count too low to correspond to a badge region. Next, one or more template-matching machine-vision algorithms 905 are performed on each digital image to compare the candidate badge areas to one or more reference images. The results of the template-matching algorithms 905 may include one or more correlation values indicating the likelihood of a match. In a typical implementation, the time required to perform the template-matching algorithms 905 constitutes a significant portion of the overall execution time for this machine-vision system; there may be multiple candidate badge areas in every image, and each candidate badge area must be compared against multiple templates. In some cases, a color-match machine-vision algorithm may also be performed in the image to determine the color and/or surface properties of the badge. The final algorithm (or algorithms) 906 combines the results of the template matches and generates an output. This output may be a simple pass/fail output, or an overall score, or some other measurement of product quality.

In operation 1004, an overall time estimate for analyzing the image is determined. With respect to FIG. 2, the controller 220 estimates the overall time required to execute the entire set of machine-vision algorithms. This estimation may be made using a variety of techniques. For example, the controller 220 may process a test image and measure the total execution time by setting a digital timer at the beginning of the sequence of machine-vision algorithms and retrieving the timer value at the end of the sequence, thus measuring the elapsed time. Alternatively, the controller 220 may receive estimates of the machine-vision algorithm execution times from a user, or from some other source, and add them together to obtain an overall time estimate. The controller 220 may also use a look-up table to estimate typical execution times for each machine-vision algorithm and add them together to obtain a total, or the controller 220 may maintain a running average of total execution times over an operational period.

Returning to FIG. 9A, the overall estimated time to complete all of the required algorithms in this example is approximately 1350 milliseconds. This estimate is calculated based on a sum of estimated times for performing each of the algorithms or groups of algorithms. For this particular set of algorithms, the estimated time may be affected a number of factors, including: the number of point clusters identified in the key-point detection algorithm 902; the number of candidate badge areas identified in each image; and/or the number of badge templates that are to be compared to each identified badge area. In some cases, badges may require two levels of badge matching, depending on the outcome of the first level. These factors may be taken into account when computing an overall estimated time.

In operation 1006, the overall time estimate is compared to the threshold value. With respect to FIG. 2, the controller 220 compares the total execution time obtained in operation 1004 to a threshold value. The threshold value may have been provided by a user, or generated by the controller 220 based on information obtained from the PLC 211 about the production cycle, or obtained in some other manner. Typically, the threshold value is less than the time required for the production cycle. The threshold value may account for the timing of operations other than the machine-vision analysis. For example, the threshold value may account for communication latencies between components in the machine-vision system, file management operations, or processing delays. The threshold value may also provide a margin of safety for variations in the actual processing times of the machine-vision algorithms.

In operation 1020, if the overall time estimate is less than or equal to the threshold value, the controller 220 does not perform any additional operations associated with offloading portions of the machine-vision analysis to a worker 250. In this case, the setup process is complete and the machine-vision system may be ready to perform machine-vision analysis at a rate that is sufficient to keep up with production.

In operation 1008, if the overall time estimate is greater than the threshold value, then an algorithm time estimate is obtained for two or more of the machine-vision algorithms of the set of machine-vision algorithms obtained in operation 1002. This algorithm time estimate characterizes the execution time of the two or more machine-vision algorithms when performing machine-vision analysis on the digital image. With respect to FIG. 2, the algorithm time estimates may be determined by the controller 220 or provided to the controller 220 as input. In one example, the controller 220 determines the algorithm time estimates by using a timer to measure the execution time required by each algorithm. Alternatively, a user may specify an algorithm time estimate for each machine-vision algorithm that characterizes the algorithm's relative contribution to the total execution time.

In general, the algorithms may be evaluated individually or grouped in different ways for the purposes of estimating execution times and computing rankings. One of the purposes of estimating execution times and computing rankings may be to identify one or more algorithms that can potentially be offloaded to a worker, and determine which of these algorithms would provide a useful reduction of the overall execution time. Therefore, algorithms that cannot practically be separated from other algorithms for offloading (e.g., because they depend on the outputs of other algorithms, or are nested within other algorithms, or are logically dependent in some other manner) may be considered as a single, pipeline algorithm for the purposes of computing algorithm time estimates, as shown in FIG. 9. In some cases, a first and second machine-vision algorithm are dependent because the first machine-vision algorithm requires the output of a second machine-vision algorithm in order to execute. However, it is not necessary that all dependent algorithms be treated as a single, pipeline algorithm. In this case, the algorithm time estimate represents a composite time for the pipeline machine-vision algorithm.

In some cases, an algorithm time estimate may be computed for a group of machine-vision algorithms that are combined based on functional similarity rather than process dependency. For example, the time estimate for the template-matching algorithms 905 depends, in part, on the number of badges in the image and the number of templates that must be checked. Each template may correspond, for example, to a different type of badge that can be installed on the vehicle. In this case, multiple instances of template-matching algorithms may be executed in parallel on two or more controllers or workers.

For the purposes of determining estimated algorithm times, the template-matching algorithms may be treated separately or combined as a single, group algorithm, depending on the scenario. In this example, there are five candidate badge areas and ten badge templates. Assuming that each template-matching algorithm takes 20 ms, the time to execute the group of template-matching algorithms may be estimated at 1000 ms (20 ms×5 candidate badge areas×10 badge templates). In some cases, the template matching for each candidate area of the image may be treated separately. In this case, there would be five group template-matching algorithms, each group algorithm estimated at 200 ms (20 ms×10 badge templates).

Returning to FIG. 8, in operation 1010, a rank associated with the two or more algorithms is computed based on their algorithm time estimates. With reference to FIG. 2, the controller 220 computes a rank for two or more machine-vision algorithms using the algorithm estimated times obtained in operation 1012. If the machine-vision algorithm is part of a group or pipeline of algorithms, then the algorithm times of the group or pipeline are combined for purposes of computing the rank. Thus, the rank represents the relative time estimated to perform a machine-vision algorithm (or group or pipeline of algorithms) as compared to the other machine-vision algorithms in the set.

Figure 9B:
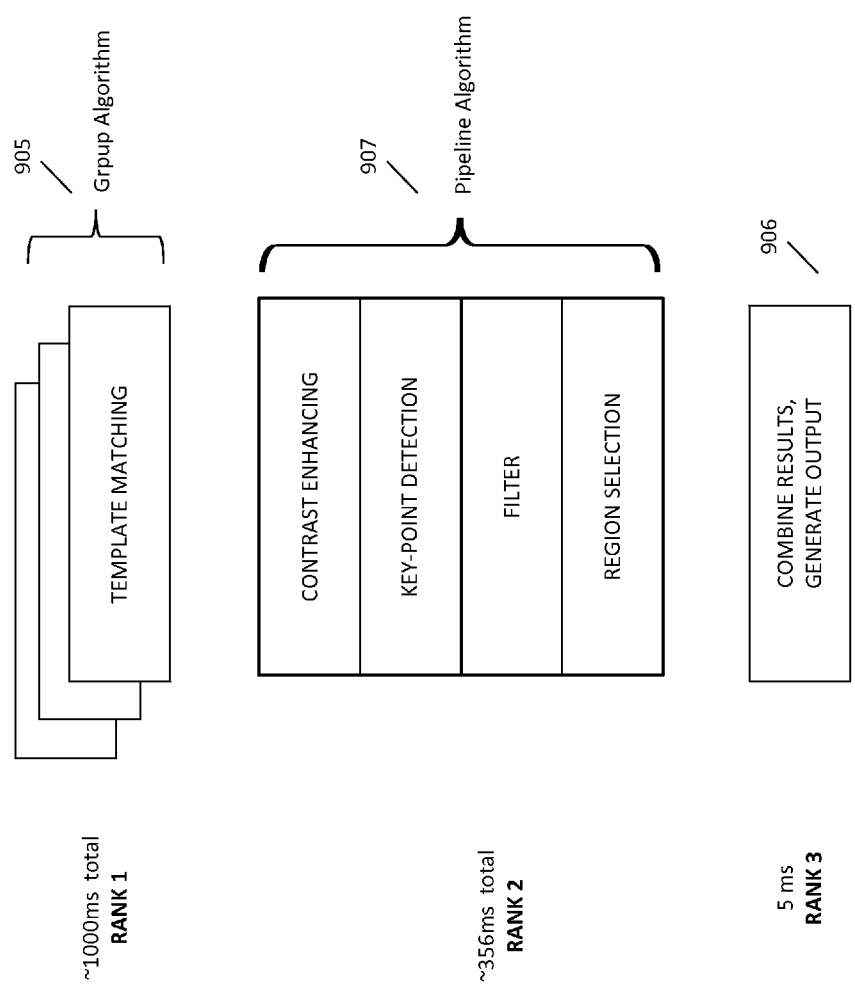
FIG. 9B depicts an exemplary ranking of a set of machine-vision algorithms.

FIG. 9B depicts the set of machine-vision algorithms of FIG. 9A with exemplary computed ranks. In this example, the ranks are computed based on the algorithm execution times of each machine-vision algorithm. Because the template-matching algorithms 905 are treated as a single, group algorithm, the total execution time is large, as compared to the other algorithms in the set. Thus, it is ranked the highest among the algorithms shown in FIG. 9B. In this example, the contrast-enhancing algorithm, key-point detection algorithm, filtering algorithm, and region-selection algorithm are treated as a single, pipeline algorithm 907. These algorithms are collectively ranked second highest in the group. The final algorithms 906 consume the least amount of time, and are assigned the lowest rank. If the algorithms are grouped or pipelined differently, the computation of the rank will likely change.

In operation 1012, a designated algorithm is selected to be performed on a worker. With respect to FIG. 2, the controller 220 selects one or more of the machine-vision algorithms obtained in operation 1002 to offload to a worker 250 based on the algorithm rankings computed in operation 1008. With reference to FIG. 9B, the group template-matching algorithm 905 may be selected as the designated algorithm based on its rank of 1. In this case, the entire group of template-matching algorithms may be selected for execution on a single worker 250. In the case where a number 1 rank algorithm is a pipeline algorithm consisting of multiple dependent algorithms, the pipeline algorithm may be selected for execution on a worker 250.

In some cases, more than one algorithm may be selected for execution on a worker. For example, a second estimated total execution time may be computed by assuming that the algorithm selected in operation 1012 will be performed on a worker. That is, the second estimated total execution time accounts for the estimated reduction in execution time due to the offloading of the designated algorithm. If the second estimated execution time exceeds the threshold value, then another algorithm (which may be a pipeline or group algorithm) may be designated for execution on a worker based on the computed rank. This process may be repeated until the total execution time is estimated to be less than the threshold value.

In some cases, the designated algorithm is caused to be performed on the worker. With reference to FIG. 2, the controller 220 may transmit an instruction to the worker 250 along with a memory pointer to the current digital image. In response, the worker 250 may retrieve the image from a location indicated by the memory pointer and perform the designated algorithm. In some cases, the controller 220 sends a signal (which may include an instruction) to the worker 250 without a memory pointer.

Once the process 1000 is completed, the machine-vision system may be used to perform machine-vision analysis on both a controller and worker. Because portions of the machine-vision analysis may be performed in parallel, the machine-vision system may satisfy the timing constraints of the production line. In some cases, process 1000 is repeated at an interval or at the beginning of each production run. Process 1000 may also be repeated in response to a change in the processing load required by the machine-vision analysis, or in response to a change in the timing of the production line.

FIG. 10 depicts an exemplary process 1100 for monitoring the quality of a product using the machine-vision system with load-balancing capabilities. Process 1100 represents an exemplary operation of a machine-vision system after the setup procedure of process 1000 has been completed.

Prior to operation 1102, a digital image is captured. With respect to FIG. 2, a portion of a vehicle 218 is captured as a digital image by inspection station 212A, 212B, or 212C. As mentioned previously, the inspection stations 212A-C include a digital camera having a CCD sensor for converting an optical image into an electronic signal. The electronic signal is processed by the digital camera to produce a digital image. The digital image is at least momentarily stored in a computer memory cache in the inspection station 212A, 212B, or 212C.

As discussed previously, a digital image includes a multi-dimensional array of values that correspond to the optical input of the digital camera sensor. For purposes of the following discussion, the digital image is a two-dimensional array of pixel values, each pixel value representing a gray-scale value. A digital image that has been compressed, saved as a different image format, cropped or otherwise altered is referred to herein as the same digital image.

In operation 1102, the digital image is transmitted to the controller. With respect to the example depicted in FIG. 2, the digital image of a portion of a vehicle is transmitted from the inspection station 212A, 212B, or 212C to the controller 220 using data network 251.

The digital image is typically transferred in a standard image file format, including, for example, a standard bitmap, jpeg, or tiff image file format. In some cases, other data is transmitted along with the digital image. For example, data indicating the camera settings, light settings, time, date, and other information related to the state of inspection station may also be transmitted to the controller 220.

In operation 1004, the digital image is analyzed using a first machine-vision algorithm. With reference to FIG. 2, the controller 220 begins executing the obtained sequence of machine-vision algorithms to analyze the digital image and determine whether the vehicle badge matches one of the specified templates. As described earlier with respect to FIG. 9A, the specified machine-vision algorithms may include contrast-enhancement steps, key-point detection, filtering, and template-matching, among other algorithms.

FIG. 6 depicts the results of an exemplary analysis of multiple captured digital images 301, 305, 310. As shown in FIG. 6, the digital images 301, 305, 310 have been analyzed to identify regions that contain the representation of the vehicle badges. As shown in FIG. 6, the regions for each digital image 301, 305, 310 are indicated by the bounding boxes 302, 306, 311, respectively. In this example, a portion of each digital images located in the 111 area indicated by bounding boxes 302, 306, 311 may be further analyzed using a series of templates to identify the type of badge that has been installed on the vehicle.

In operation 1106, a processing request is sent to a worker. With respect to FIG. 2, the controller 220 sends a processing request to the worker 250 to execute the machine-vision algorithm that was selected for offloading during the setup process described in FIG. 8. This request may include an instruction and a memory pointer to the image to be analyzed. In some cases, the image to be analyzed may have been altered or modified by previously executed machine-vision algorithms. For example, the image may have been cropped, such that the image retrieved by the worker 250 is a cropped version of the original image captured by inspection stations 212A-C. In some embodiments, the controller 220 may send processing requests to multiple workers 250. For example, the controller 220 may send an instruction and a pointer to the image of a vehicle badge to multiple workers 250, each of which may compare a different candidate badge area to a set of templates template.

In operation 1108, the digital image is analyzed using the designated algorithm at the worker. With respect to FIG. 2, the worker 250 may retrieve an image from the archive server 230, in response to the instruction and memory pointer transmitted from the controller 220. The retrieved image may then be analyzed using the designated machine-vision algorithm. During this operation, the controller 220 may continue execution of other machine-vision algorithms. For example, the controller 220 may perform a template-matching algorithm on the image using a first template in parallel with the worker 250 performing a template-matching algorithm using a second, different template.

In operation 1110, the result from the designated machine-vision algorithm is transmitted. With respect to FIG. 2, the worker 250 transmits the result or results of the offloaded machine-vision algorithms to the controller 220 over the data network 256.

In operation 1112, a measurement is computed. With respect to FIG. 2, the controller 220 incorporates the result from a worker 250 and executes any remaining machine-vision algorithms required to complete the analysis of the image. For example, the controller 220 may receive the results of a template-matching algorithm executed by a worker 250, then perform an additional color-matching step based on which template was the most likely match. When the controller 220 has finished all additional processing required, the controller 220 computes a final measurement for the image. The measurement may be a measurement of a specific feature of the part, for example, or a metric associated with the quality of the part, or even a simple "pass/fail" indicator.

Figure 7:
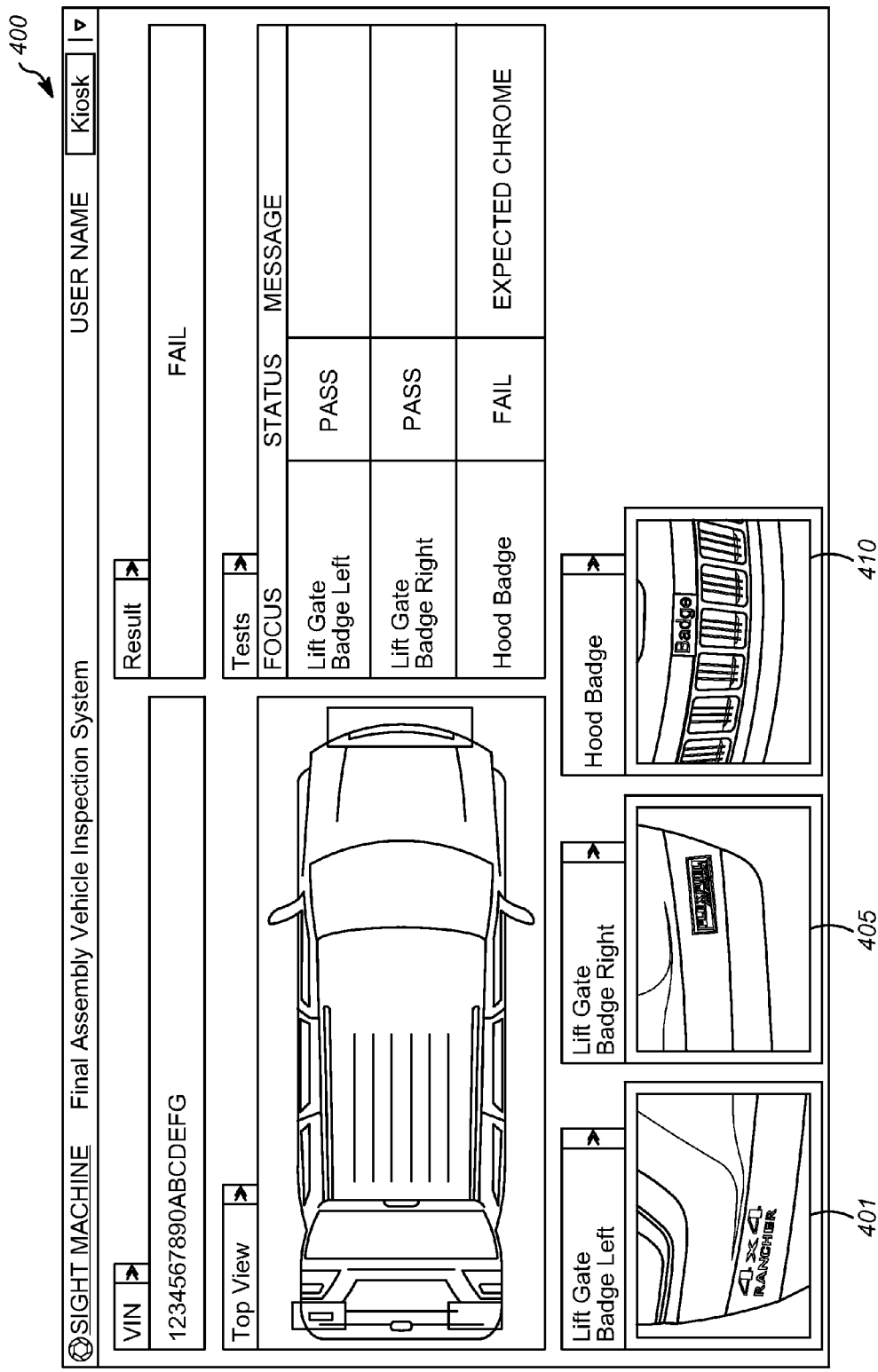
FIG. 7 depicts an exemplary graphical user interface displaying the results of machine-vision analysis.

The results of the badge analysis described above may be displayed using a user interface screen 400, as shown in FIG. 7. The user interface screen 400 includes multiple digital images 401, 405, and 410 that correspond to the images 310, 305, and 310 captured by the inspection stations. The user interface screen 400 also displays the results calculated using the machine-vision analysis outlined above. The results may indicate whether the vehicle that was inspected has failed the quality test because one of its badges is of the incorrect type.

3. Implementation on a Computer Hardware Platform

Figure 11:
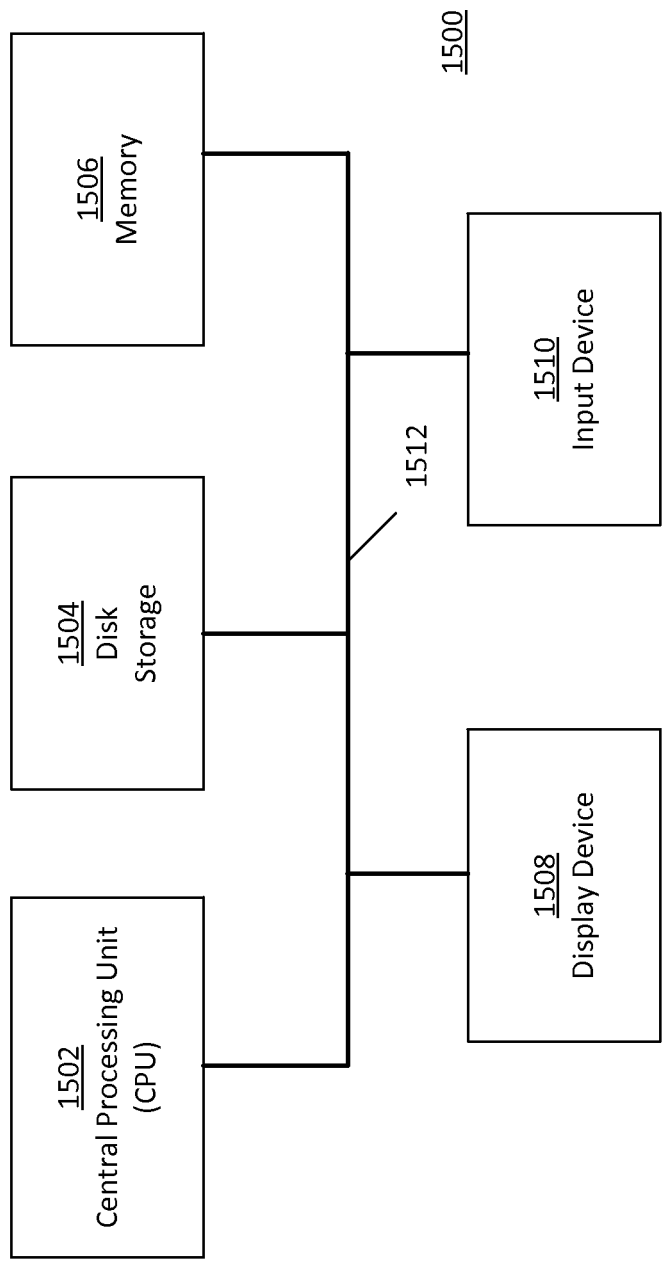
FIG. 11 depicts an exemplary computer system.

With reference to exemplary machine-vision system 200 depicted in FIG. 2, multiple components of the machine-vision system 200 are implemented using a computer hardware platform. Specifically, the controller 220, the worker 250 and the archive server 230 are each implemented in this example as specially configured computer hardware platforms. While each of these components may be optimized for the functions required by the machine-vision system 200, there are elements that each of these components have in common. FIG. 11 depicts the elements that are common among computer hardware platforms used in the embodiments discussed herein.

FIG. 11 depicts a computer system 1500 with several standard components that may be used to perform certain aspects of the functionality associated with the machine-vision system. Specifically, the computer system 1500 includes a central processing unit (CPU) 1502 to execute computer-readable instructions; non-transitory computer memory 1506 to store computer-readable instructions, and disk storage 1504 for storing data and computer-readable instructions; a display device 1508 for displaying system outputs; and an input device 1510 for receiving input from a user. The CPU, memory, disk, display, and input units are connected by one or more bidirectional buses 1512 that transmit data and/or computer-readable instructions between the units.

The computer system 1500 of FIG. 11 may be used, for example, to implement the controller 220 of FIG. 4. In this case, the CPU 1502 may be used to execute machine-vision algorithms on the image data collected from the inspection stations 212A-C to obtain measurements. The CPU 1502 may also execute the load-balancing setup procedure for identifying algorithms to offload to a worker. The CPU 1502 may also execute the state machine logic used by state machine 224 to interface with the inspections stations 212A-C and/or the PLC 211 of the automation system. The memory unit 1506 may be used to store machine-vision algorithms, computational results, vision analysis queries, or other types of data or computer-readable instructions. In some cases, the controller 220 does not have a display device 1508.

The computer system 1500 of FIG. 11 may also be used to implement the worker 250 of FIG. 2. In this case, CPU 1502 may be used to execute the offloaded machine-vision algorithms on a digital image received from one or more controllers 220. The memory unit 1506 may be used to store machine-vision algorithms, computational results, queries, or other types of data or computer-readable instructions. In some cases, the worker 250 does not have a display device 1508. In some cases, the worker 250 is an embedded system that shares the CPU 1502 and memory unit 1506 with other processes or embedded systems.

The computer system 1500 of FIG. 11 may also be used to implement the archive server 230 of FIG. 2. In this case, the disk storage unit 1504 may be used to archive digital images received from one or more controllers 220. The CPU 1502 may be used to calculate quality metrics, and to implement machine-vision algorithms on archived digital images and digital images that are being received from one or more controllers 220. The memory unit 1506 may be used to store machine-vision algorithms, computational results, queries, or other types of data or computer-readable instructions. In some cases, the archive server 230 does not have a display device 1508.

The previous descriptions are presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

What is claimed is:

1. A computer-implemented method for designating a portion of a machine-vision analysis to be performed on a worker, the method comprising:
    obtaining a set of machine-vision algorithms for analyzing a digital image of a product;
    determining an overall time estimate that represents the processing time to analyze the digital image using the entire set of machine-vision algorithms;
    if the overall time estimate is greater than a threshold value:
        obtaining an algorithm time estimate for each of two or more algorithms of the set of machine-vision algorithms, wherein the algorithm time estimate represents the processing time to analyze the digital image using the respective machine-vision algorithm;
        computing a rank associated with each of the two or more algorithms based on the algorithm time estimates; and
        selecting a designated algorithm to be performed on the worker, wherein the selection is based on the rank associated with each of the two or more algorithms and the designated algorithm comprises one of the two or more algorithms.

2. The computer-implemented method of claim 1, further comprising:
    analyzing the digital image on the worker using the designated algorithm.

3. The computer-implemented method of claim 1, further comprising:
    selecting a second designated algorithm based on the rank associated with each of the two or more algorithms and a difference between the overall time estimate and the threshold value, wherein the second designated algorithm comprises one of the two or more algorithms.

4. The computer-implemented method of claim 1, further comprising:
    determining a second overall time estimate that represents the processing time to analyze the digital image with the designated algorithm being performed on the worker;
    if the second overall time estimate is greater than a threshold value:
        selecting a second designated algorithm based on the rank of the two or more algorithms, wherein the second designated algorithm comprises one of the two or more algorithms.

5. The computer-implemented method of claim 4, further comprising:
    analyzing the digital image on a second worker using the second designated algorithm.

6. The computer-implemented method of claim 1, further comprising:

transmitting the digital image to a controller, the digital image having been captured using an image acquisition device;
    analyzing the digital image at the controller using a first machine-vision algorithm of the set of machine-vision algorithms to compute a first result;
    transmitting a processing request to the worker to perform the designated algorithm;
    analyzing the digital image at the worker using the designated algorithm to compute a second result; and
    transmitting the second result to the controller; and
    computing and storing a measurement based on the first result and the second result.

7. The computer-implemented method of claim 6, wherein the analysis using the first machine-vision algorithm at the controller and the analysis of the second machine-vision algorithm at the worker occur at least partially in parallel.

8. The computer-implemented method of claim 6, further comprising:
    computing a quality metric based on the measurement, wherein the quality metric relates to the quality of the product; and
    displaying the quality metric on a user interface.

9. The computer-implemented method of claim 1, further comprising:
    transmitting the digital image to an archive server on a first data network;
    storing the digital image on the archive server;
    transmitting the digital image to the worker on the first data network;
    analyzing the digital image on the worker using the designated algorithm to obtain one or more of:
        an analyzed digital image, and
        a measurement; and
    transmitting the analyzed digital image or the measurement to a controller.

10. The computer-implemented method of claim 1, wherein one or more machine-vision algorithm of the set of machine-vision algorithms is a pipeline algorithm, wherein the pipeline algorithm includes at least a first machine-vision algorithm and a second machine-vision algorithm, wherein the output of the second machine-vision algorithm depends on the output of the first machine-vision algorithm.

11. A non-transitory computer-readable storage medium including computer-readable instructions that when executed on a computer processor cause the computer processor to designate a portion of a machine-vision analysis to be performed on a worker, the instructions comprising:
    obtaining a set of machine-vision algorithms for analyzing a digital image of a product;
    determining an overall time estimate that represents the processing time to analyze the digital image using the entire set of machine-vision algorithms;
    if the overall time estimate is greater than a threshold value:
        obtaining an algorithm time estimate for each of two or more algorithms of the set of machine-vision algorithms, wherein the algorithm time estimate represents the processing time to analyze the digital image using the respective machine-vision algorithm,
        computing a rank associated with each of the two or more algorithms based on the algorithm time estimates,
        selecting a designated algorithm to be performed on the worker, wherein the selection is based on the rank associated with each of the two or more algorithms and the designated algorithm comprises one of the two or more algorithms.

12. The non-transitory computer-readable storage medium of claim 11, further comprising:
analyzing the digital image on the worker using the designated algorithm.

13. The non-transitory computer-readable storage medium of claim 11, the instructions further comprising:
selecting a second designated algorithm based on the rank associated with each of the two or more algorithms and a difference between the overall time estimate and the threshold value, wherein the second designated algorithm comprises one of the two or more algorithms.

14. The non-transitory computer-readable storage medium of claim 11, further comprising:
determining a second overall time estimate that represents the processing time to analyze the digital image with the designated algorithm being performed on the worker;
if the second overall time estimate is greater than a threshold value:
selecting a second designated algorithm based on the rank of the two or more algorithms, wherein the second designated algorithm comprises one of the two or more algorithms.

15. The non-transitory computer-readable storage medium of claim 11, further comprising:
analyzing the digital image on a second worker using the second designated algorithm.

16. The non-transitory computer-readable storage medium of claim 11, the instructions further comprising:
transmitting the digital image to the controller, the digital image having been captured using an image acquisition device;
analyzing the digital image at the controller using a first machine-vision algorithm of the set of machine-vision algorithms to compute a first result;
transmitting a processing request to the worker to perform the designated algorithm;
analyzing the digital image at the worker using the designated algorithm to compute a second result; and
transmitting the second result to the controller; and
computing and storing a measurement using the first result and the second result.

17. The non-transitory computer-readable storage medium of claim 16, the instructions further comprising:
computing a quality metric based on the measurement, wherein the quality metric relates to the quality of the product; and
displaying the quality metric on a user interface.

18. The non-transitory computer-readable storage medium of claim 16, the instructions further comprising:
transmitting the digital image to an archive server on a first data network;
storing the digital image on the archive server;
transmitting the digital image to the worker on the first data network;
analyzing the digital image using the designated algorithm on the worker to obtain one or more of:
a analyzed digital image, and
a measurement; and
transmitting the analyzed digital image or the measurement to the controller.

19. The non-transitory computer-readable storage medium of claim 16, wherein one or more machine-vision algorithm of the set of machine-vision algorithms is a pipeline algorithm, wherein the pipeline algorithm includes at least a first machine-vision algorithm and a second machine-vision algorithm, wherein the output of the second machine-vision algorithm depends on the output of the first machine-vision algorithm.

20. A machine-vision system for designating a portion of a machine-vision analysis to be performed on a worker, the system comprising:
a controller connected to an image acquisition device over a first data network, wherein the controller is configured to:
obtain a set of machine-vision algorithms for analyzing a digital image;
determine an overall time estimate that represents the processing time to analyze the digital image using the entire set of machine-vision algorithms;
if the overall time estimate is greater than a threshold value:
obtain an algorithm time estimate for each of two or more algorithms of the set of machine-vision algorithms, wherein the algorithm time estimate represents the processing time to analyze the digital image using the respective machine-vision algorithm,
compute a rank associated with each of the two or more algorithms based on the algorithm time estimates,
select a designated algorithm to be performed on the worker, wherein the selection is based on the rank associated with each of the two or more algorithms and the designated algorithm comprises one of the two or more algorithms; and
the worker connected to the controller over a second data network, wherein the worker is configured perform the designated algorithm.

21. The machine-vision system of claim 20, wherein the controller is further configured to:
determine a second overall time estimate that represents the processing time to analyze the digital image with the designated algorithm being performed on the worker;
if the second overall time estimate is greater than a threshold value:
select a second designated algorithm based on the rank of the two or more algorithms, wherein the second designated algorithm comprises one of the two or more algorithms.

22. The machine-vision system of claim 20,
wherein the controller is further configured to:
analyze the digital image using a first machine-vision algorithm of the set of machine-vision algorithms to compute a first result;
transmit a processing request to the worker to perform the designated algorithm; and
compute and store a measurement using the first result and a second result, and wherein the worker is further configured to:
analyze the digital image using the designated algorithm to compute the second result; and
transmit the second result to the controller.

23. The machine-vision system of claim 22, further comprising:
a remote terminal configured to display a user interface screen,
wherein the controller is further configured to:
compute a quality metric based on the measurement, wherein the quality metric relates to the quality of the product; and
cause the quality metric to be displayed on the user interface screen of the remote terminal.

24. The machine-vision system of claim 20, further comprising:
- an archive server configured to:
  - receive the digital image over the second data network;
  - store the digital image; and
  - transmit the digital image to the worker over the second data network
- wherein the controller is further configured to:
  - transmit the digital image to the archive server, wherein the archive server is configured to store the image;
  - transmit the digital image to the worker on the second data network,
- wherein the worker is further configured to:
  - analyze the digital image using the designated algorithm to obtain one or more of:
    - an analyzed digital image, and
    - a measurement; and
  - transmit the analyzed digital image or the measurement to the controller.

* * * * *